United States Patent
Lv (10) Patent No.: US 12,244,230 B2
(45) Date of Patent: Mar. 4, 2025

(54) SWITCHED-MODE POWER SUPPLY AND CONTROL CIRCUIT FOR USE IN SWITCHED-MODE POWER SUPPLY

(71) Applicant: SHANGHAI BRIGHT POWER SEMICONDUCTOR CO., LTD., Shanghai (CN)

(72) Inventor: Danzhu Lv, Shanghai (CN)

(73) Assignee: SHANGHAI BRIGHT POWER SEMICONDUCTOR CO., LTD., Shanghai (CN)

(*) Notice: Subject to any disclaimer, the term of this patent is extended or adjusted under 35 U.S.C. 154(b) by 332 days.

(21) Appl. No.: 18/075,607

(22) Filed: Dec. 6, 2022

(65) Prior Publication Data

US 2023/0198399 A1  Jun. 22, 2023

(30) Foreign Application Priority Data

Dec. 17, 2021  (CN) ......................... 202111555380.1

(51) Int. Cl.
*H02M 3/158* (2006.01)
*H02M 1/00* (2006.01)
*H02M 1/42* (2007.01)

(52) U.S. Cl.
CPC ......... *H02M 3/158* (2013.01); *H02M 1/0025* (2021.05); *H02M 1/4258* (2013.01)

(58) Field of Classification Search
CPC ... H02M 3/158; H02M 1/0025; H02M 1/4258
See application file for complete search history.

(56) References Cited

U.S. PATENT DOCUMENTS

| 6,377,480 | B1 | 4/2002 | Sase et al. | |
|---|---|---|---|---|
| 2014/0002043 | A1* | 1/2014 | Li | H02M 3/156 323/282 |
| 2014/0009081 | A1* | 1/2014 | Fujiwara | H03K 7/08 327/175 |
| 2021/0135563 | A1* | 5/2021 | Wei | H02M 7/53876 |

FOREIGN PATENT DOCUMENTS

| CN | 1625034 A | 6/2005 |
|---|---|---|
| CN | 108445947 A | 8/2018 |
| JP | 2015012668 A | 1/2015 |

* cited by examiner

*Primary Examiner* — Rafael O De Leon Domenech
(74) *Attorney, Agent, or Firm* — MUNCY, GEISSLER, OLDS & LOWE, P.C.

(57) ABSTRACT

A switched-mode power supply and a control circuit for use in a switched-mode power supply are disclosed. In addition to an EA module, a PWM comparator module and a soft-start voltage generation module, the control circuit also includes an amplitude limiter module for limiting the amplitude of an EA signal based on a soft-start reference voltage and thereby enabling the amplitude of a signal input to the PWM comparator module from the EA module to follow a soft-start control signal and vary stably and smoothly. This can reduce the risk of output voltage and inductor current overshoots due to DC loop establishment during startup of the switched-mode power supply, enhance stability and safety of the power supply system during startup, and accelerate the DC loop establishment.

12 Claims, 8 Drawing Sheets

FIG. 8

SWITCHED-MODE POWER SUPPLY AND CONTROL CIRCUIT FOR USE IN SWITCHED-MODE POWER SUPPLY

CROSS-REFERENCES TO RELATED APPLICATIONS

This application claims the priority of Chinese patent application number 202111555380.1, filed on Dec. 17, 2021, the entire contents of which are incorporated herein by reference.

TECHNICAL FIELD

The present invention relates to the field of electric power and, in particular, to a control circuit for use in a switched-mode power supply and such a switched-mode power supply.

BACKGROUND

A switched-mode power supply system often uses an error amplifier (EA) as a feedback adjustment module. In the switched-mode power supply, a DC loop typically consists of the EA, a filter network, a pulse width modulator and other modules provides negative feedback for adjusting an output voltage, which can effectively eliminate random offsets introduced by fabrication, inherent offsets introduced by design and the like to achieve accurate control of the output voltage.

While powering on a switched-mode power supply, an off-chip capacitor will be charged rapidly, thus introducing a high surge current in an on-chip inductor. This current may cause overshoots during startup, which tends to cause abnormal operation of the circuit or even damage thereto. In order to overcome this problem, most existing switched-mode power supplies incorporate soft-start functions, which set a limitation on an output voltage, current or power at a low level during system startup and then gradually lift the limitation.

However, in existing soft-start designs employed in switched-mode power supplies, offset voltage calibration is usually unavailable as the establishment of a negative feedback loop just starts at the beginning of startup, so an EA output signal tends to deviate from its equilibrium value or be saturated. If such an EA output is directly fed into the DC loop, significant output ripple will be introduced, causing output voltage and inductor current overshoots.

SUMMARY OF THE INVENTION

The present invention provides a control circuit for use in a switched-mode power supply and such a switched-mode power supply to eliminate output voltage and inductor current overshoots during startup of the switched-mode power supply. Therefore, the power supply exhibits enhanced system stability and safety.

In one aspect, the present invention provides a control circuit for use in a switched-mode power supply. The control circuit includes:

an EA module having an input terminal at which a feedback voltage is received and another input terminal at which a reference voltage is received, the EA module configured to output an EA signal;

a soft-start voltage generation module for producing a soft-start reference voltage of gradually increasing amplitude;

an amplitude limiter module for limiting amplitude of the EA signal based on the soft-start reference voltage; and a PWM comparator module having a first input terminal at which the amplitude-limited EA signal is received and a second input terminal at which a high-frequency signal is received, the PWM comparator module configured to output a PWM signal, wherein the feedback voltage characterizes an output voltage, output current or output power of the switched-mode power supply, and the PWM signal is configured to control operation of the switched-mode power supply.

Optionally, the EA module may further include a filter circuit for low-pass filtering the EA signal.

Optionally, the amplitude limiter module may include a variable gain stage arranged at an output terminal of the EA module, the variable gain stage configured to allow its gain to be adjusted based on the soft-start reference voltage.

Optionally, the amplitude limiter module may further include a controlled current source under the control of the soft-start reference voltage, the controlled current source configured to output to the variable gain stage a bias current for controlling the gain of the variable gain stage so that the gain of the variable gain stage gradually increases with a gradual increase of the bias current.

Optionally, the amplitude limiter module may further include a controlled current source under the control of a bias voltage, the controlled current source configured to output to the variable gain stage a bias current for controlling the gain of the variable gain stage so that the gain of the variable gain stage gradually increases with a gradual increase of the bias current.

Optionally, the bias voltage signal may show the same variation trend as the soft-start reference voltage.

Optionally, the amplitude limiter module may include a multiplier arranged at an output terminal of the EA module, the multiplier configured to receive the EA signal and a bias voltage signal and output the multiplication product of the EA signal and the bias voltage signal to the first input terminal of the PWM comparator module. Optionally, the bias voltage signal may show the same variation trend as the soft-start reference voltage.

Optionally, the amplitude limiter module may include a variable current source arranged at a bias current terminal of the EA module, the variable current source configured to adjust the amplitude of its output current based on the soft-start reference voltage and thereby control the amplitude of an output voltage or current of the EA module. Optionally, the output current of the variable current source may show the same variation trend as the soft-start reference voltage.

In one aspect, the present invention provides a switched-mode power supply including the control circuit as defined above.

Optionally, the switched-mode power supply may start operation in a soft-start manner, with an output voltage, output current or output power of the switched-mode power supply gradually increasing to a target value.

In addition to the EA module, the PWM comparator module and the soft-start voltage generation module, the control circuit provided in this invention also includes the amplitude limiter module for limiting the amplitude of the EA signal based on the soft-start reference voltage and thereby limiting the amplitude of the signal input to the PWM comparator module from the EA module during startup of the switched-mode power supply. The control circuit provided in this invention enables the amplitude of the signal to desirably follow the soft-start reference voltage to vary stably and smoothly. This can reduce output voltage and inductor current overshoots during startup of the switched-mode power supply, enhance stability and safety of the power supply system during startup, and accelerate the establishment of DC loop. The switched-mode power supply provided in the present invention has similar advantages.

DESCRIPTION OF REFERENCE NUMERALS IN DRAWINGS

110: EA Module; 120: PWM Comparator Module; 130: Soft-Start Voltage Generation Module; 140: Amplitude Limiter Module; 141: Bias Voltage Module; 150: Drive and Control Module.

DETAILED DESCRIPTION

Switched-mode power supplies and control circuits according to particular embodiments of the present invention will be described in greater detail below with reference to the accompanying drawings. From the following description, advantages and features of the invention will become more apparent. Note that the figures are provided in a very simplified form not necessarily drawn to exact scale and for the only purpose of facilitating easy and clear description of the embodiments.

In order to avoid overshooting of a switched-mode power supply during its startup and thereby enhance its system stability and safety, according to the present invention, the amplitude of a signal present at an output terminal of an error amplification (EA) module or an input terminal of a PWM comparator module (or main comparator module) in a DC loop during startup. In this way, the above problem can be effectively overcome, as explained in more details in the following particular embodiments.

In an embodiment of the present invention, there is provided a control circuit for use in a switched-mode power supply. The switched-mode power supply may adopt one of the non-isolated buck, non-isolated boost, non-isolated buck-boost and isolated flyback topologies. The switched-mode power supply employs, for example, the constant on-time (COT) control mode that features a simple loop, less reliance on peripheral devices, which facilitates board-level integration, fast response and high efficiency under light load condition. The following description is set forth in the exemplary context of a buck DC-DC converter. For example, the control circuit is provided as a control chip, or integrated with the other components of the switched-mode power supply within a single chip.

Figure 1:
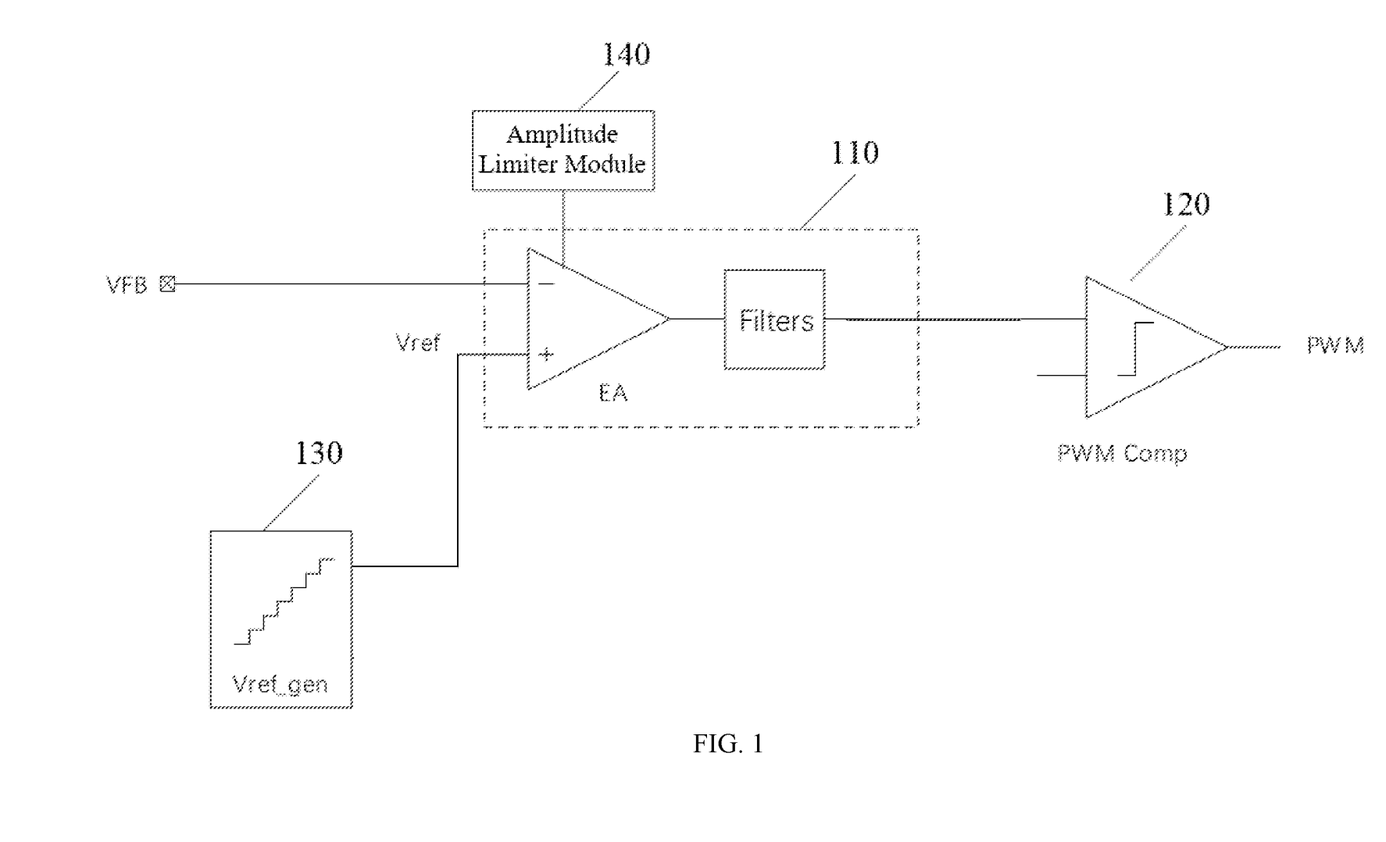
FIG. 1 is a schematic illustration of a control circuit for use in a switched-mode power supply according to an embodiment of the present invention.
Figure 2:
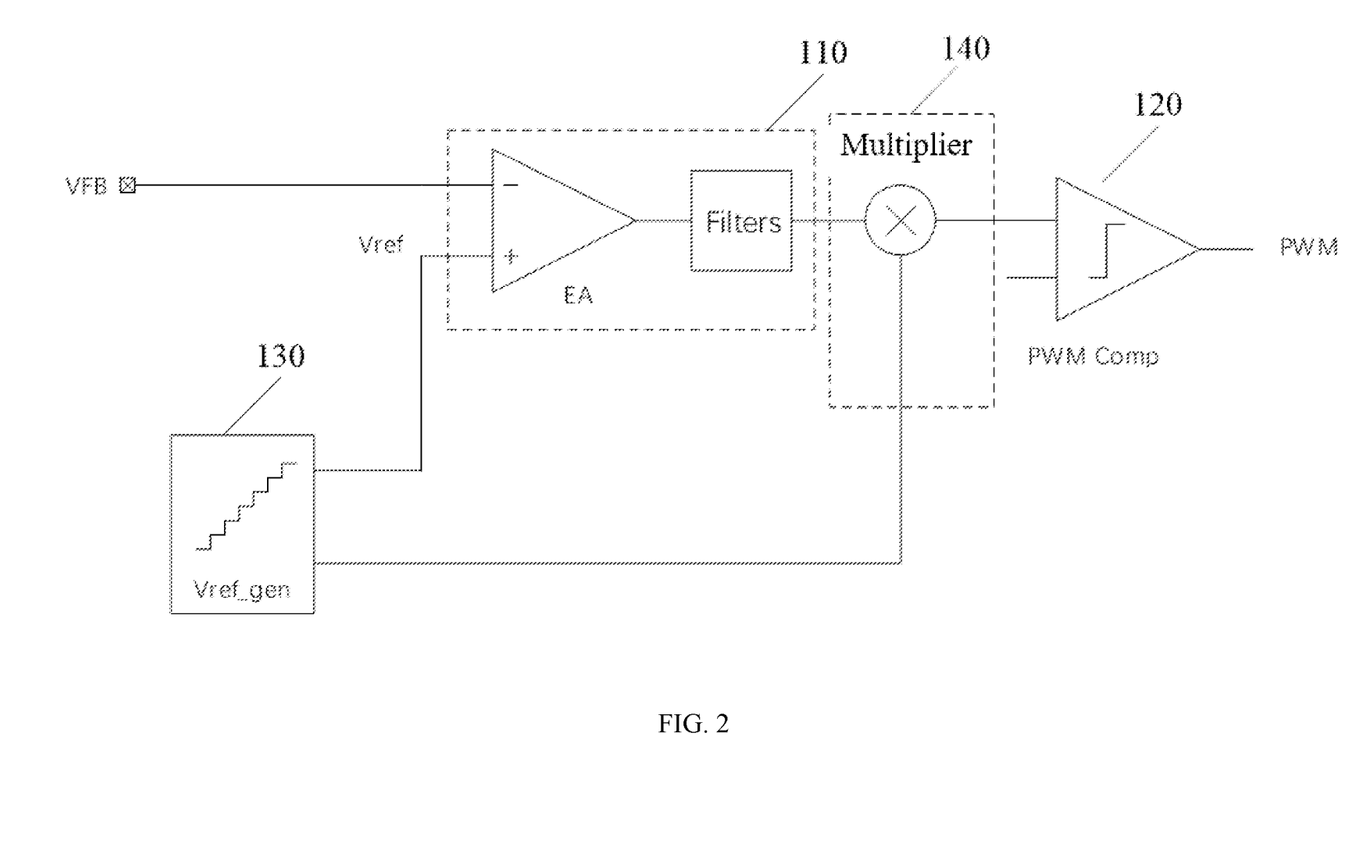
FIG. 2 is a schematic illustration of a control circuit for use in a switched-mode power supply according to another embodiment of the present invention.

FIG. 1 is a schematic illustration of the control circuit for use in a switched-mode power supply according to an embodiment of the present invention, and FIG. 2 is a schematic illustration of the control circuit for use in a switched-mode power supply according to another embodiment of the present invention. Referring to FIGS. 1 and 2, the control circuit includes an EA module 110, a PWM comparator module 120, a soft-start voltage generation module 130 and an amplitude limiter module 140. Specifically, a feedback voltage VFB from the switched-mode power supply is received at one terminal of the EA module 110, and a reference voltage Vref is received at another input terminal of the module. The EA module 110 is configured to output an EA signal. The feedback voltage VFB characterizes an output voltage, output current or output power from the switched-mode power supply. A first input terminal of the PWM comparator module 120 is coupled to an output terminal of the EA module 110 (in order to receive the EA signal that has been amplitude-limited), and a high-frequency signal is received at a second input terminal of the PWM comparator module 120. The PWM comparator module 120 is configured to output a PWM signal for controlling operation of the switched-mode power supply. The soft-start voltage generation module 130 is configured to generate a soft-start reference voltage Vref with gradually increasing amplitude, which is fed into the DC loop as a reference value for soft-start of the switched-mode power supply. The amplitude limiter module 140 is configured to be based on the soft-start reference voltage Vref to limit the amplitude of the EA signal (i.e., limit the amplitude of the signal input from the EA module 110 to the PWM comparator module 120). Through limiting the amplitude of the signal input from the EA module 110 to the PWM comparator module 120 by the amplitude limiter module 140, the occurrence of an inductor current or output voltage overshoot during soft-start (in particular, at the beginning thereof) can be avoided.

In the control circuit for use in a switched-mode power supply according to embodiments of present invention, the EA module 110, the PWM comparator module 120 and the soft-start voltage generation module 130 can be implemented by circuit designs known in the art. The EA module 110 may include a filter circuit, and the EA signal output from the EA module 110 may have been low-pass filtered by the filter circuit. Specifically, as shown in FIGS. 1 and 2, the EA module may include an error amplifier EA and the filter circuit ("Filters"). The error amplifier EA is configured to receive the feedback voltage VFB from the switched-mode power supply and the soft-start reference voltage Vref. Here, the EA signal from the EA module 110 is a signal that has been amplified by the error amplifier EA and then processed by the filter circuit. The output terminal of the EA module 110 is coupled to the first input terminal of the PWM comparator module 120, and a high-frequency signal (e.g., a high-frequency triangular wave signal) is received at the second input terminal of the PWM comparator module 120. In this way, the PWM signal produced by the PWM comparator module 120 has a duty cycle in relation to the magnitude of the EA signal from the EA module 110. The PWM signal is, for example, square wave signal, for example, used to generate a control signal for the switched-mode power supply, which controls operation of a power switching device in the switched-mode power supply.

The soft-start voltage generation module 130 may be implemented by a digital or analog circuit known in the art. For example, according to an embodiment of the present invention, the soft-start voltage generation module 130 may include a D flip-flop, an edge detection circuit, a T flip-flop and other digital circuits and a digital-to-analog converter DAC and other components. The produced soft-start reference voltage Vref may increase linearly or stepwise. As shown in FIGS. 1 and 2, the soft-start reference voltage Vref from the soft-start voltage generation module 130 may increase stepwise within the range [0, $V_{target}$]. The soft-start reference voltage Vref from the soft-start voltage generation module 130 may serve as a reference voltage to be compared with the feedback voltage VFB.

The embodiments shown in FIGS. 1 and 2 differ from each other mainly in the arrangement of the amplitude limiter module 140. As shown in FIG. 1, in one embodiment, the amplitude limiter module 140 is arranged at a bias current terminal of the EA module 110 to directly control a bias current for the EA module 110 and hence the amplitude of the signal output from the control EA module 110. Specifically, in this embodiment, the amplitude limiter module 140 may include a variable current source (not shown) for outputting a steadily increasing current signal of amplitude adjusted based on the soft-start reference voltage Vref as the bias current for the EA module 110. Here, by the term "steadily increasing", it is meant that the signal increases at a speed varying with the progress of the soft-start process in such a manner that voltage and current overshoots are avoided. A range of increase may depend on the specific circuit implementation. In this embodiment, through limiting the bias current for the EA module 110, the amplitude of the signal at the output terminal of the EA module 110, i.e., the amplitude of the signal input to the first input terminal of the PWM comparator module 120, can be limited. In this way, output voltage ripple can be reduced, and inductor current overshoots can be avoided, during startup of the switched-mode power supply. As shown in FIG. 2, in one embodiment, the amplitude limiter module 140 is arranged at the output terminal of the EA module 110 to directly control the amplitude of the signal (current or voltage) at the output terminal of the EA module 110. As shown in FIG. 2, in this embodiment, the amplitude limiter module 140 may include a multiplier disposed at the output terminal of the EA module 110, which is configured to adjust the amplitude of the signal input to the PWM comparator module 120 from the EA module 110. One input terminal of the multiplier is coupled to the output terminal of the EA module 110, and the soft-start reference voltage Vref is received at another input terminal of the multiplier. The multiplier is configured to perform a multiply operation to cause the amplitude of the signal input to the first input terminal of the PWM comparator module 120 to gradually rise with the increase of the soft-start reference voltage Vref, thereby reducing output voltage ripple and avoiding inductor current overshoots during startup of the switched-mode power supply.

Figure 3:
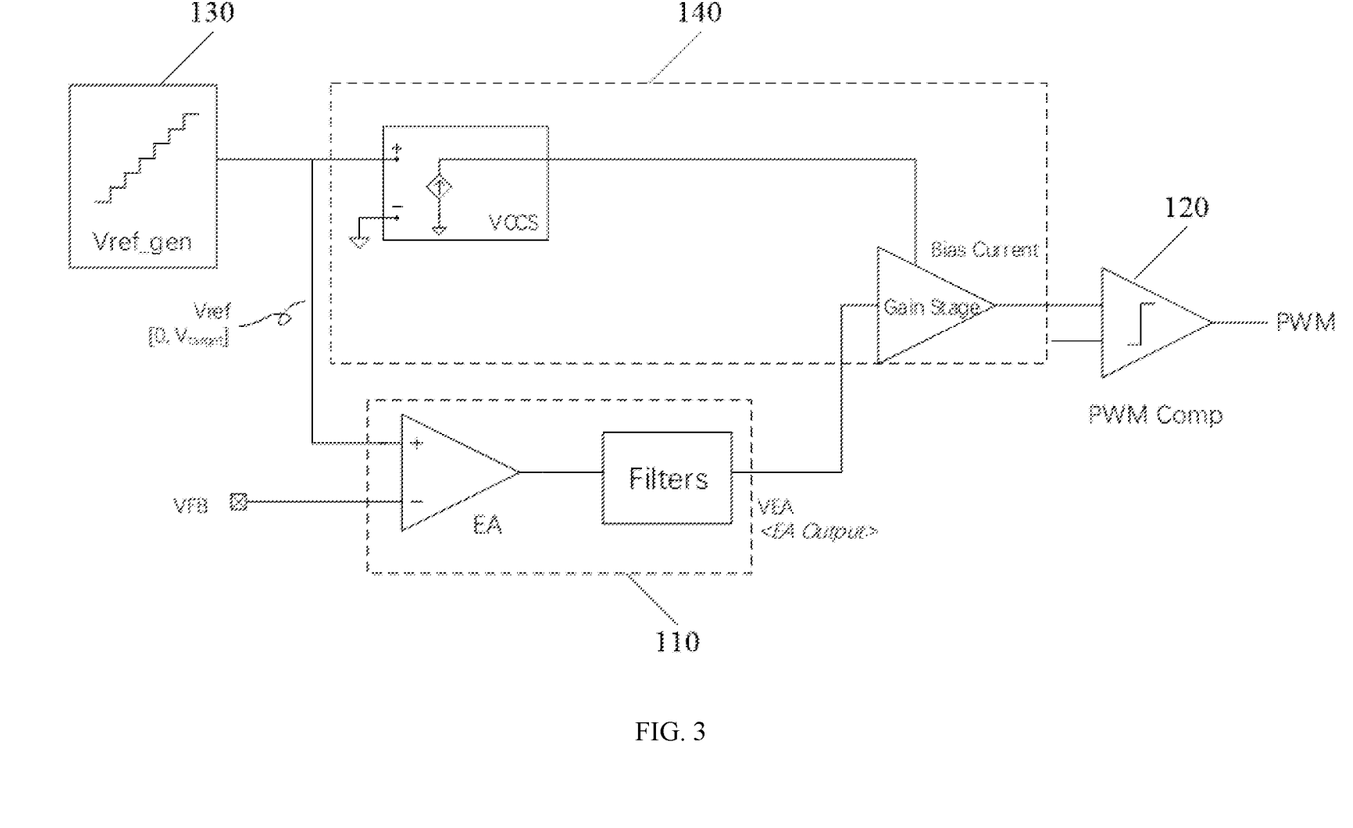
FIG. 3 is a schematic illustration of a control circuit for use in a switched-mode power supply according to a further embodiment of the present invention.

FIG. 3 schematically illustrates a variable gain stage serving as a control circuit for the amplitude limiter module according to an embodiment of the present invention. Referring to FIG. 3, according to an embodiment of the present invention, in the control circuit for use in a switched-mode power supply, the variable gain stage is provided in the amplitude limiter module 140 and disposed at the output terminal of the EA module 110. A gain of an output signal from the variable gain stage (labeled as "Gain Stage" in the figure) is controlled by a bias current ("Bias Current"). During soft-start of the switched-mode power supply, the bias current for the variable gain stage gradually increases with the reference voltage Vref from zero (or a certain low value) to a target value. In response, the amplitude of the signal input to the first input terminal of the PWM comparator module 120 increases from zero (or a certain low value) to a predetermined value, thereby avoiding excessive voltage ripple or a current overshoot at beginning of the soft-start process.

As shown in FIG. 3, the amplitude limiter module 140 may include a voltage-controlled current source VCCS configured to receive a steadily increasing voltage signal and output the bias current signal to the variable gain stage. Upon the bias current signal gradually increasing to the target value, the amplitude of an output from the variable gain stage will reach the predetermined value. The steadily increasing voltage signal received by the voltage-controlled current source VCCS may be implemented as the aforementioned reference voltage signal from the soft-start voltage generation module 130. That is, in addition to being input to the EA module 110, the reference voltage Vref output from the soft-start voltage generation module 130 in the DC loop is also used as a control voltage for the voltage-controlled current source VCCS. However, the present invention is not so limited, as in some other embodiments, the amplitude limiter module 140 may include a bias voltage unit for generating a steadily increasing voltage signal independent of the soft-start voltage generation module 130. The steadily increasing voltage signal is input to the voltage-controlled current source VCCS to enable the generation of the bias current signal output to the variable gain stage.

Figure 4:
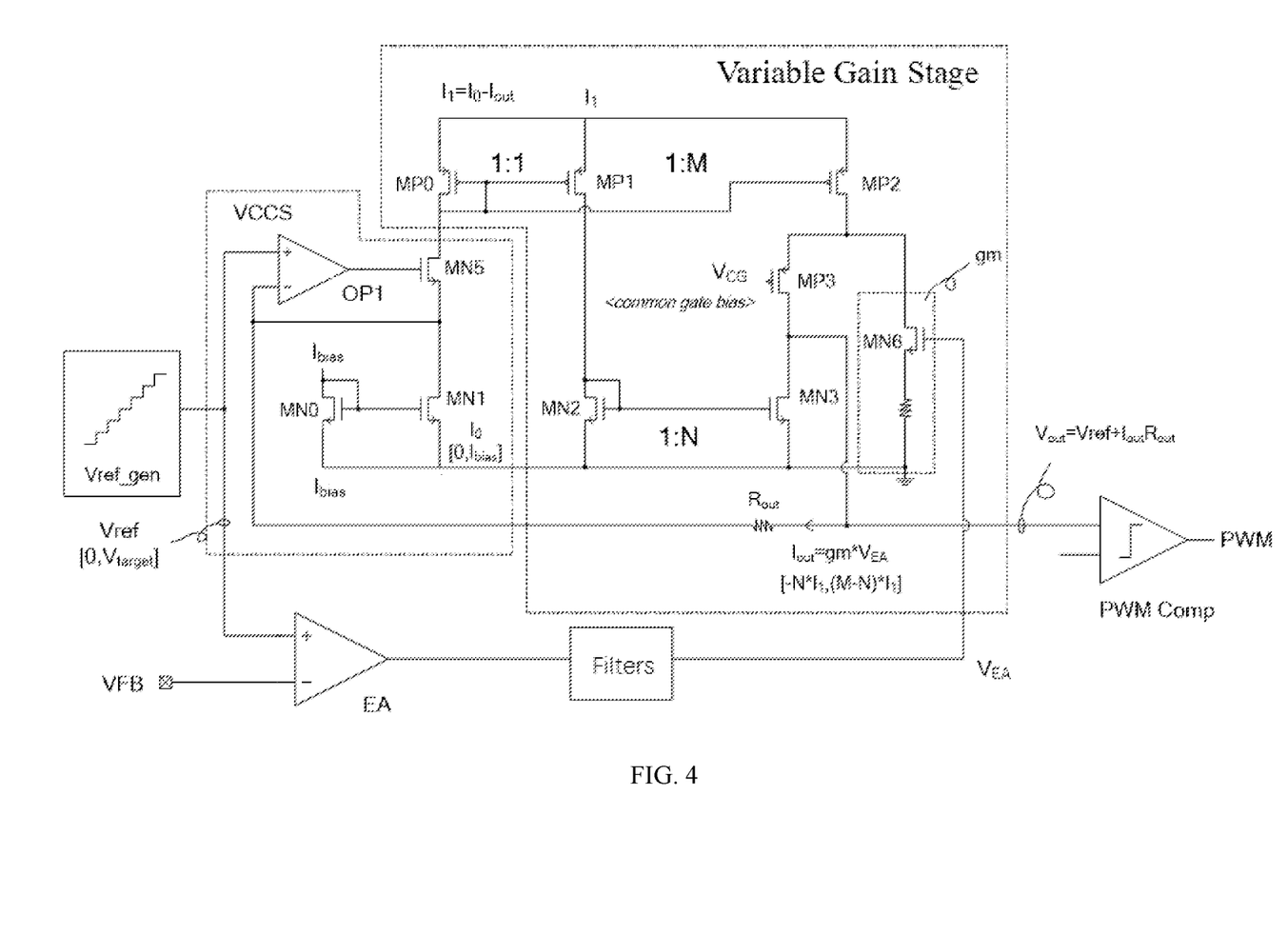
FIG. 4 is a detailed schematic illustration of a control circuit for use in a switched-mode power supply according to a further embodiment of the present invention.

FIG. 4 is a detailed schematic diagram of the control circuit incorporating the variable gain stage according to an embodiment of the present invention. FIG. 4 shows possible internal circuit implementations of the voltage-controlled current source VCCS and the variable gain stage ("Gain Stage") of FIG. 3. Referring to FIG. 4, in one embodiment, the voltage-controlled current source VCCS includes an op-amp OP1 and transistors MN0, MN1 and MN5. The steadily increasing voltage signal (in this embodiment, implemented as the reference voltage Vref from the soft-start voltage generation module 130) is received at a non-inverting input terminal of OP1, and the current $I_{out}$ output from the variable gain stage is received at an inverting input terminal of OP1. An output terminal of OP1 is coupled to a control terminal (gate) of MN5. MN5 is connected in series with MN1, and a source of MN5 is shorted to the inverting input terminal of OP1. A drain of MN0 is shorted to the control terminal and coupled to a control terminal of MN1. The bias current $I_{bias}$ is provide at the drain of MN0, and sources of MN0 and MN1 are coupled together and output a current denoted by $I_0$. $I_0$ varies within the range [0, $I_{bias}$]. The variable gain stage includes transistors MP0, MP1, MP2, MP3, MN2, MN3 and MN6. A drain of MP0 is coupled to a drain of MN5 in VCCS. A source of MP0 is coupled to sources of MP1 and MP2, and a control terminal of MP0 is coupled to control terminals of the MP1 and MP2, so that the three transistors make up a cascade with gains of 1:1 and 1:M. A drain of MP1 is coupled to a drain of MN2, which is in turn shorted to a control terminal of itself. Control terminals of MN2 and MN3 are coupled together, and their sources are also coupled together, so that the two transistors make up a cascade with a gain of 1:N. A drain of MP2 is coupled to both a source of MP3 and a drain of MN6, and a control terminal of MP3 is coupled to an on-chip gate bias $V_{CG}$ (common gate bias). A drain of MP3 is coupled to a drain of MN3, and a source of MN6 is grounded via a resistor. A control terminal of MN6 is coupled to the output terminal of the EA module 110 (more precisely, an output terminal of the filter circuit ("Filters")). In this variable gain stage, the sources of MN1, MN2 and MN3 are coupled together and grounded, and the drain of the MN3 is coupled to the first input terminal of the PWM comparator module 120 at a node connected to the inverting input terminal of OP1 via a resistor $R_{out}$. The current $I_{out}$ flows through the resistor $R_{out}$. MN6 is a transconductance (gm). $I_{out}$ is expressed as $I_{out}=gm*V_{EA}$, where $V_{EA}$ is a voltage corresponding to the EA signal output from the EA module 110. A source current $I_1$ of MP0 is the difference between a source current $I_0$ of MN1 and $I_{out}$ (i.e., $I_1=I_0-I_{out}$). $I_{out}$ varies within the range $[-N*I_1, (M-N)*I_1]$. The voltage $V_{out}$ at the first input terminal of PWM comparator module 120 can be expressed as $V_{out}=Vref+I_{out}R_{out}$. It is to be noted that the internal circuits of the voltage-controlled current source VCCS and the variable gain stage ("Gain Stage") shown in FIG. 4 are merely examples, and alternative circuit designs are also possible in other embodiments.

In the control circuit shown in FIG. 4, with the reference voltage Vref gradually increasing (from 0 to a target voltage $V_{target}$) during soft-start, the gain of the variable gain stage increases from 0. When Vref is 0, MN1 operates in a linear region and $V_{DS}=0$. Therefore, the current $I_0$ is also 0, and no current flows in MN3, MN6, MP3 and MP2. Moreover, the gain of the variable gain stage is 0, and the output voltage of the variable gain stage is equal to Vref. Thus, the DC loop is out of operation. As Vref gradually increases from 0, MN1 moves out of the linear region, and the shown current $I_0$ gradually increases to $I_{bias}$. Moreover, the output amplitude of the variable gain stage gradually increases to a predetermined value.

Figure 5:
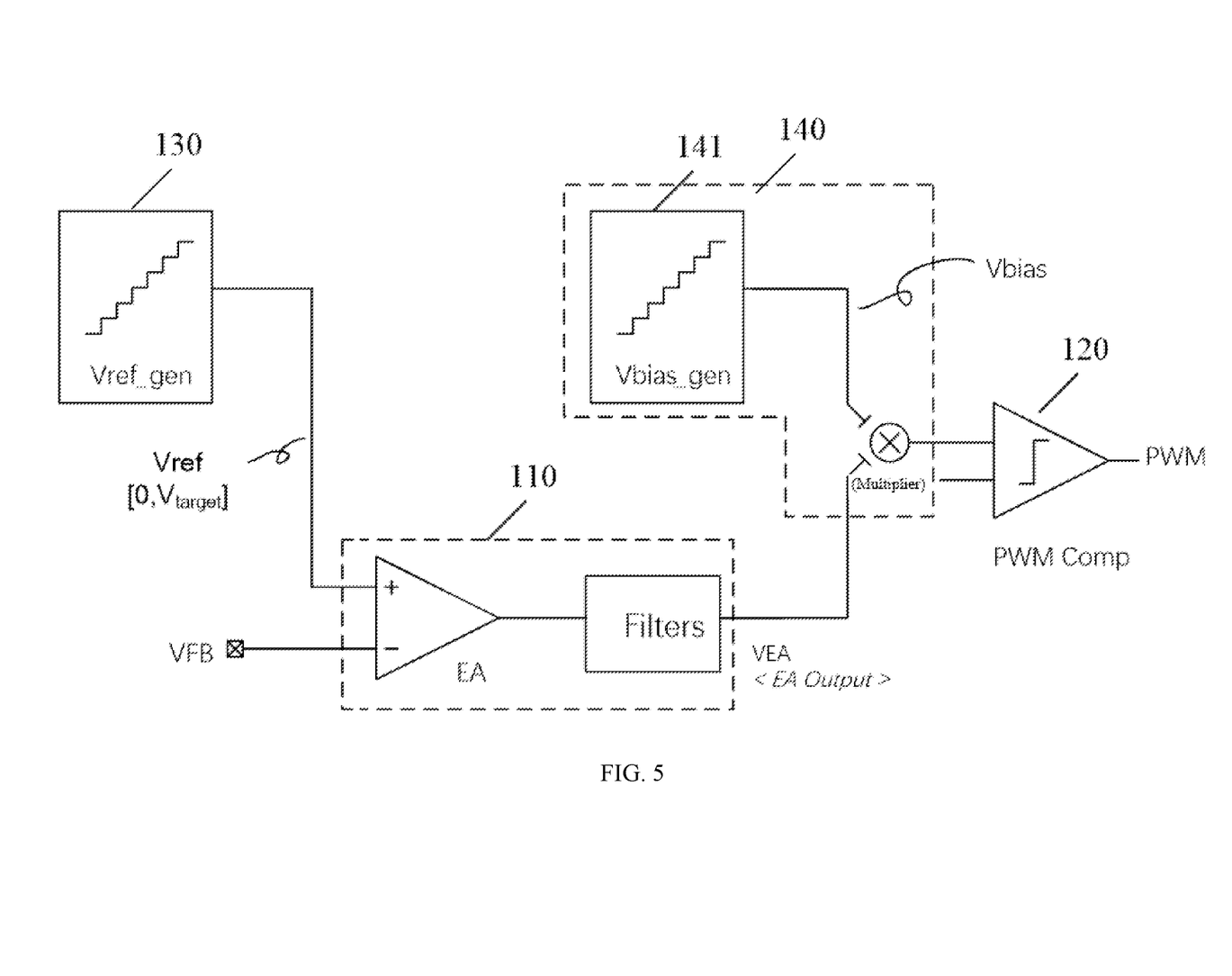
FIG. 5 is a schematic illustration of a control circuit for use in a switched-mode power supply according to a further embodiment of the present invention.

FIG. 5 is a schematic diagram of the control circuit incorporating the variable gain stage according to another embodiment of the present invention. Referring to FIG. 5, in another embodiment, the control circuit for use in a switched-mode power supply includes the EA module 110, the PWM comparator module 120, the soft-start voltage generation module 130 and the amplitude limiter module 140, as discussed above. Their functions are the same as in the embodiment of FIG. 2. The amplitude limiter module 140 includes a multiplier. One input terminal of the multiplier is coupled to the output terminal of the EA module 110, and the steadily increasing voltage signal Vbias is received at another input terminal of the multiplier. Differing from the embodiment of FIG. 2, in this embodiment, the steadily increasing voltage signal is separately provided, rather than sourced from the soft-start reference voltage signal Vref, in order to limit the amplitude of the signal input to the PWM comparator module 120 from the EA module 110 during soft-start. The steadily increasing voltage signal Vbias may vary at a speed depending on the soft-start reference voltage signal Vref so as to reduce output voltage ripple and avoid inductor current overshoots during startup of the switched-mode power supply. An output terminal of the multiplier is coupled to the first input terminal of the PWM comparator module 120, and a high-frequency signal is received at the second input terminal of the PWM comparator module 120.

Referring to FIG. 5, at the beginning of soft-start of the switched-mode power supply, Vbias, as well as an output from the multiplier, is 0 or a low non-zero value, which limits the amplitude of the signal at the first input terminal of the PWM comparator module 120. Subsequently, with Vbias gradually increasing to a target value, the amplitude of the output from the multiplier also increases from 0 to a target level. In the embodiments of FIGS. 2 and 5, as soon as the soft-start voltage generation module 130 is activated, the amplitude limiter module 140 starts functioning to cause the amplitude of the signal at the first input terminal of the PWM comparator module 120 to increase gradually during soft-start to avoid output voltage and inductor current overshoots. When the soft-start process is completed, the output from the switched-mode power supply has stabilized, and the output from the amplitude limiter module 140 may have reached the target value before the completion of the soft-start process (a control signal for limiting the amplitude of the output from the amplitude limiter module 140 may be produced by a dedicated functional module). However, the present invention is not so limited. For example, with the signal provided by the soft-start voltage generation module 130 for controlling amplitude limitation, the amplitude limiter module 140 can accomplish amplitude limitation throughout the soft-start process.

Figure 6:
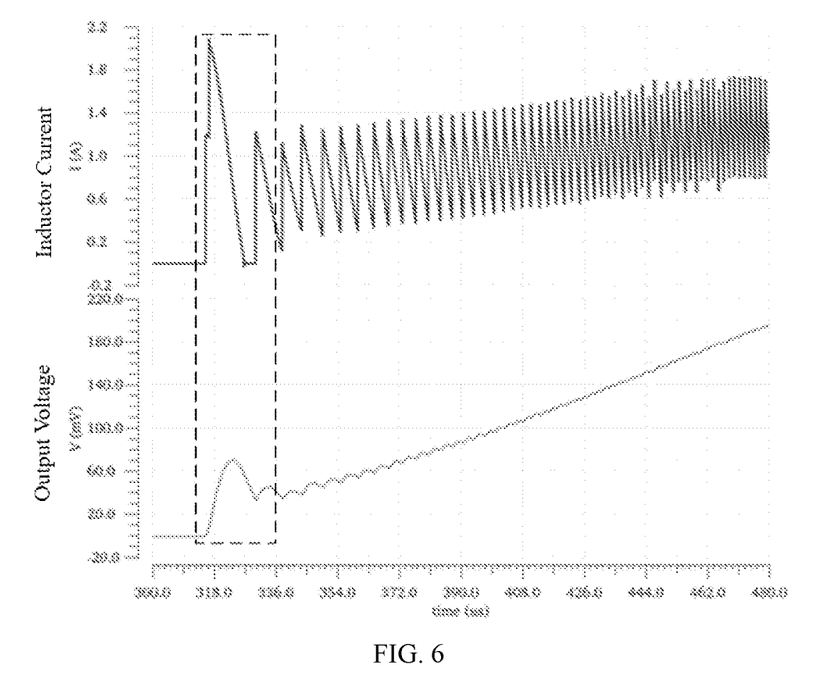
FIG. 6 schematically illustrates inductor current and output voltage waveforms during soft-start of an existing switched-mode power supply.
Figure 7:
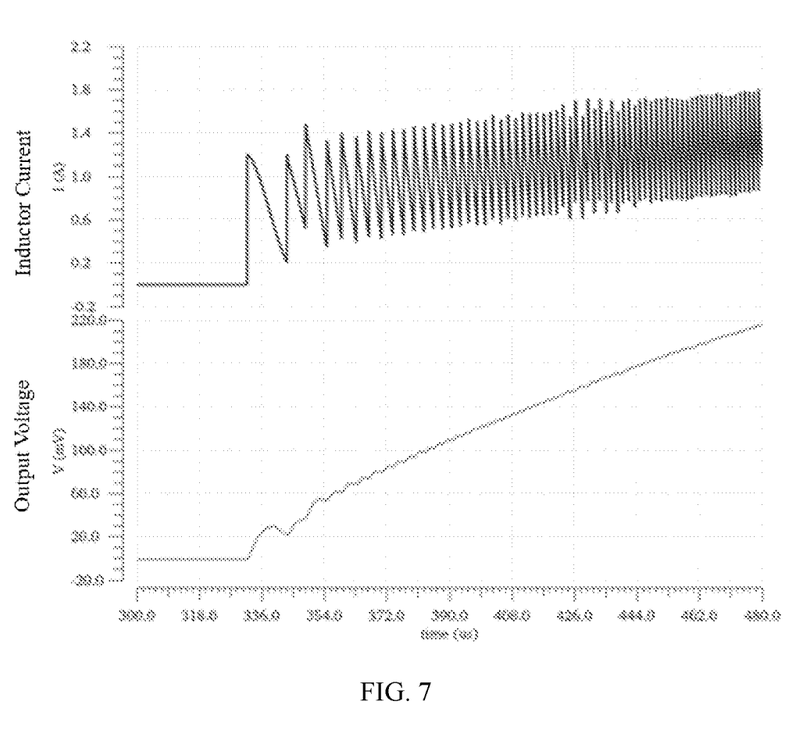
FIG. 7 schematically illustrates inductor current and output voltage waveforms during soft-start of a switched-mode power supply employing a control circuit according to an embodiment of the present invention.

FIG. 7 schematically illustrates inductor current and output voltage waveforms during soft-start of a switched-mode power supply incorporating a control circuit according to an embodiment of the present invention. As can be seen, during soft-start of the switched-mode power supply, output voltage ripple and inductor current overshoots are both reduced, when compared with schematic inductor current and output voltage waveforms during soft-start (indicated by the dotted line box) of an existing switched-mode power supply shown in FIG. 6. With the control circuit of the present invention, the risk of increased output ripple and inductor current overshoots due to DC loop establishment during startup of the switched-mode power supply can be avoided, enhancing stability and safety of the power supply system during startup, allowing the output voltage and current to better follow the soft-start control signal and accelerating establishment of the DC loop.

In an embodiment of the present invention, there is also provided a switched-mode power supply including the control circuit of any of the foregoing embodiments. The switched-mode power supply employs, for example, the constant on-time (COT) control mode. Moreover, it may adopt one of the non-isolated buck, non-isolated boost, non-isolated buck-boost and isolated flyback circuit topologies.

Figure 8:
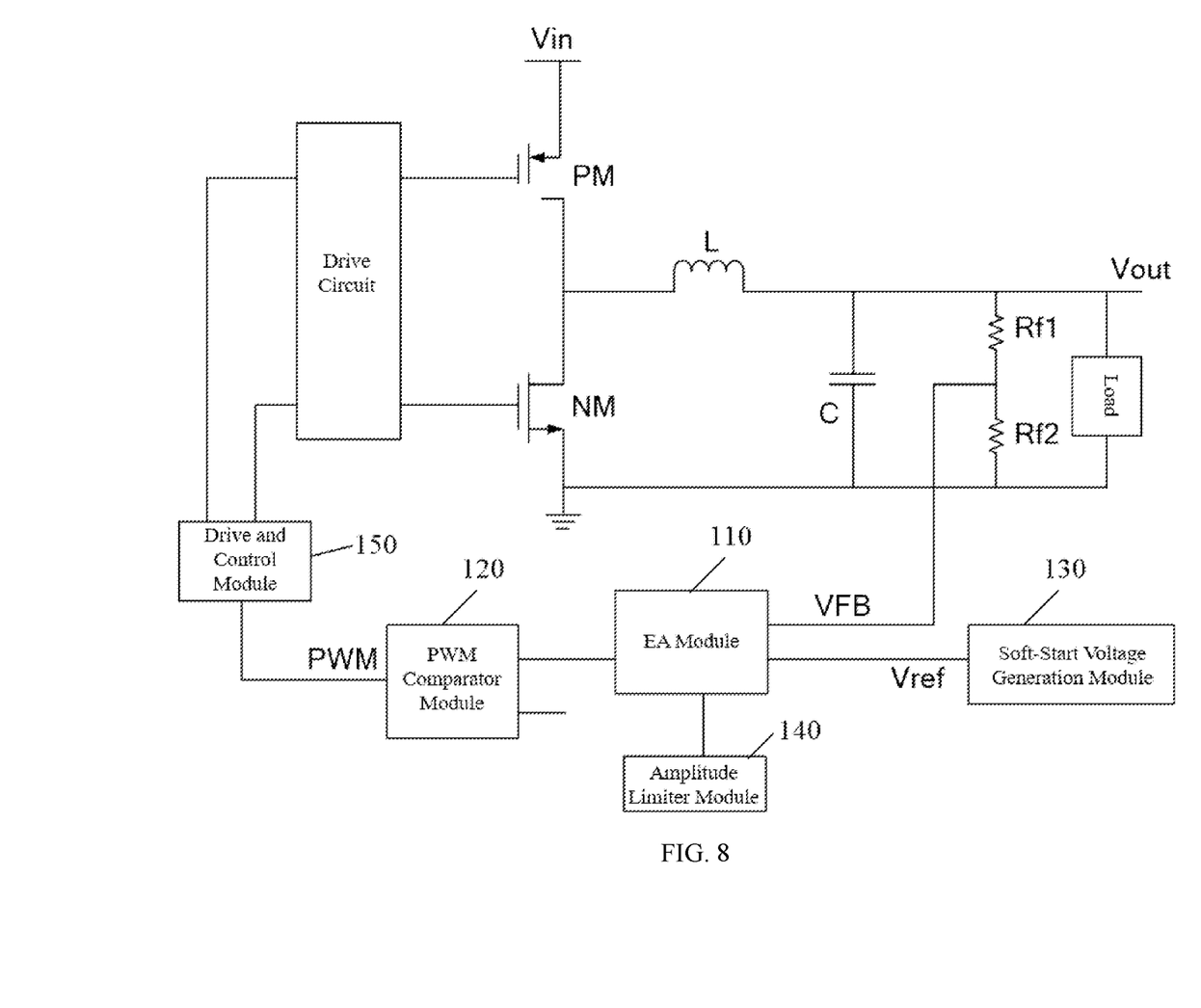
FIG. 8 is a schematic illustration of a switched-mode power supply employing a control circuit according to an embodiment of the present invention.

FIG. 8 is a schematic illustration of the switched-mode power supply according to an embodiment of the present invention. Referring to FIG. 8, the switched-mode power supply is, for example, a DC-DC converter employing the COT control mode. The switched-mode power supply includes a high-side power transistor PM, a low-side power transistor NM, an inductor L and a filter capacitor C. It may also include the above-described control circuit and a drive circuit. The control circuit may further include voltage divider resistors Rf1 and Rf2 and a drive and control module 150, in addition to the EA module 110, the PWM comparator module 120, the soft-start voltage generation module 130 and the amplitude limiter module 140, as described above (the arrangement of the amplitude limiter module 140 in FIG. 8 is merely a possible implementation thereof, and reference can be made to the foregoing detailed description of the amplitude limiter module made in FIGS. 1 to 5). During operation of the switched-mode power supply, the feedback voltage VFB is obtained by dividing the output voltage Vout from the switched-mode power supply with the voltage divider resistors Rf1 and Rf2 and fed to one of the input terminals of the EA module 110. The drive and control module 150 is coupled to an output terminal of the PWM comparator module 130 and configured to process the PWM signal output from the PWM comparator module 130 to obtain two control signals and provide the two signals to the drive circuit. The drive circuit utilizes the two control signals to turn on and off the high-side power transistor PM and the low-side power transistor NM in the switched-mode power supply. The input voltage Vin of the switched-mode power supply is coupled to a source of the high-side power transistor PM, and a source of the low-side power transistor NM is grounded. Drains of the high-side power transistor PM and the low-side power transistor NM are coupled to one end of the inductor L, and the other end of the inductor L is coupled to the filter capacitor C. Thus, an output voltage from the high-side power transistor PM can be filtered to form the stable DC voltage output (Vout).

Since the switched-mode power supply employs the control circuit of one of the foregoing embodiments, the amplitude limiter module 140 can limit the amplitude of the signal input to the PWM comparator module 130 from the EA module 110 during soft-start so that the amplitude of the signal can desirably follow the soft-start control signal to vary stably and smoothly (e.g., gradually increase at a substantially constant speed to the target value). In this way, the risk of output ripple and inductor current overshoots due to DC loop establishment during startup of the switched-mode power supply can be reduced, achieving high stability and safety of the power supply system during startup and accelerated establishment of the DC loop.

It is to be noted that the embodiments disclosed herein are described in a progressive manner, with the description of each embodiment focusing on its differences from others. Reference can be made between the embodiments for their identical or similar parts.

The foregoing description is merely that of several preferred embodiments of the present invention and is not intended to limit the scope of the claims of the invention in any way. Any person of skill in the art may make various possible variations and changes to the disclosed embodiments in light of the methodologies and teachings disclosed hereinabove, without departing from the spirit and scope of the invention. Accordingly, any and all such simple variations, equivalent alternatives and modifications made to the foregoing embodiments based on the essence of the present invention without departing from the scope of the embodiments are intended to fall within the scope of protection of the invention.

What is claimed is:

1. A control circuit for use in a switched-mode power supply, the control circuit comprising:
   an error amplifier (EA) module having an input terminal at which a feedback voltage is received and another input terminal at which a reference voltage is received, the EA module configured to output an EA signal;
   a soft-start voltage generation module configured to produce a soft-start reference voltage of gradually increasing amplitude;
   an amplitude limiter module configured to limit an amplitude of the EA signal based on the soft-start reference voltage; and
   a pulse width modulation (PWM) comparator module having a first input terminal at which the amplitude-limited EA signal is received and a second input terminal at which a high-frequency signal is received, the PWM comparator module configured to output a PWM signal,
   wherein the feedback voltage characterizes an output voltage, an output current or an output power of the switched-mode power supply, and the PWM signal is configured to control operation of the switched-mode power supply.

2. The control circuit of claim 1, wherein the EA module further comprises a filter circuit configured to low-pass filter the EA signal.

3. The control circuit of claim 1, wherein the amplitude limiter module comprises a variable gain stage arranged at an output terminal of the EA module, the variable gain stage configured to allow its gain to be adjusted based on the soft-start reference voltage.

4. The control circuit of claim 3, wherein the amplitude limiter module further comprises a controlled current source under the control of the soft-start reference voltage, the controlled current source configured to output to the variable gain stage a bias current for controlling the gain of the variable gain stage so that the gain of the variable gain stage gradually increases with a gradual increase of the bias current.

5. The control circuit of claim 3, wherein the amplitude limiter module further comprises a controlled current source under the control of a bias voltage signal, the controlled current source configured to output to the variable gain stage a bias current for controlling the gain of the variable gain stage so that the gain of the variable gain stage gradually increases with a gradual increase of the bias current.

6. The control circuit of claim 5, wherein the bias voltage signal is configured by the same variation trend as the soft-start reference voltage.

7. The control circuit of claim 2, wherein the amplitude limiter module comprises a multiplier arranged at an output terminal of the EA module, the multiplier configured to receive the EA signal and a bias voltage signal and output the multiplication product of the EA signal and the bias voltage signal to the first input terminal of the PWM comparator module.

8. The control circuit of claim 7, wherein the bias voltage signal is configured by the same variation trend as the soft-start reference voltage.

9. The control circuit of claim 1, wherein the amplitude limiter module comprises a variable current source arranged at a bias current terminal of the EA module, the variable current source configured to adjust an amplitude of an output current of the variable current source based on the soft-start reference voltage and thereby control an amplitude of an output voltage or current of the EA module.

10. The control circuit of claim 9, wherein the output current of the variable current source is configured by the same variation trend as the soft-start reference voltage.

11. A switched-mode power supply comprising the control circuit of claim 1.

12. The switched-mode power supply of claim 11, which starts operation in a soft-start manner, wherein an output voltage, an output current or an output power of the switched-mode power supply gradually increases to a target value thereof.

* * * * *